(12) United States Patent
Kim et al.

(10) Patent No.: US 10,892,100 B2
(45) Date of Patent: Jan. 12, 2021

(54) MULTILAYER CAPACITOR

(71) Applicant: SAMSUNG ELECTRO-MECHANICS CO., LTD., Suwon-si (KR)

(72) Inventors: Tae Hyeok Kim, Suwon-si (KR); Sang Soo Park, Suwon-si (KR); Jae Yeol Choi, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 42 days.

(21) Appl. No.: 16/158,684

(22) Filed: Oct. 12, 2018

(65) Prior Publication Data
US 2019/0259538 A1    Aug. 22, 2019

(30) Foreign Application Priority Data

Feb. 19, 2018  (KR) .................. 10-2018-0019391
Apr. 24, 2018  (KR) .................. 10-2018-0047245

(51) Int. Cl.
*H01G 4/30* (2006.01)
*H01G 4/12* (2006.01)
*H01G 4/008* (2006.01)

(52) U.S. Cl.
CPC ............. *H01G 4/30* (2013.01); *H01G 4/008* (2013.01); *H01G 4/1227* (2013.01)

(58) Field of Classification Search
CPC .......... H01G 4/30; H01G 4/008; H01G 4/012; H01G 4/224; H01G 4/228; H01G 4/40; H01G 4/1227
See application file for complete search history.

(56) References Cited

U.S. PATENT DOCUMENTS

| | | | |
|---|---|---|---|
| 2014/0029159 A1* | 1/2014 | Shimada ................. | H01G 4/30 361/303 |
| 2015/0325370 A1* | 11/2015 | Lee .......................... | H01G 4/30 361/275.3 |
| 2017/0069428 A1* | 3/2017 | Shimizu ................... | H01G 4/30 |
| 2017/0278626 A1* | 9/2017 | Kim ........................ | H01F 27/29 |
| 2018/0137982 A1* | 5/2018 | Sawada ................... | H01G 4/012 |

FOREIGN PATENT DOCUMENTS

| | | |
|---|---|---|
| KR | 10-2014-0013996 A | 2/2014 |
| KR | 10-2015-0052507 A | 5/2015 |
| KR | 2015-0127441 A | 11/2015 |

\* cited by examiner

*Primary Examiner* — Michael P McFadden
(74) *Attorney, Agent, or Firm* — Morgan, Lewis & Bockius LLP

(57) ABSTRACT

A multilayer capacitor includes a connecting electrode provided on a surface opposite to a surface on which the capacitor body is mounted, and a third external electrode and a fourth external electrode extend to cover opposing ends of the connecting electrode across a width of the capacitor body. The third and fourth external electrodes are disposed on respective side surfaces of the capacitor body opposite each other across the width, and contact respective first and second pluralities of internal electrodes disposed in the capacitor body.

21 Claims, 4 Drawing Sheets

MULTILAYER CAPACITOR

CROSS-REFERENCE TO RELATED APPLICATION(S)

This application claims the benefit of priority to Korean Patent Application No. 10-2018-0019391, filed on Feb. 19, 2018 and Korean Patent Application No. 10-2018-0047245, filed on Apr. 24, 2018 with the Korean Intellectual Property Office, the disclosures of which are incorporated herein by reference in their entireties.

BACKGROUND

The present disclosure relates to a multilayer capacitor.

As electronic circuits become smaller and require more highly integrated components, an insufficient amount of space remains available for mounting electronic components embedded in a substrate. To solve the problem of insufficient mounting space, a method in which an electronic component is mounted in a substrate has been proposed.

One type of embedded electronic component is a three-terminal embedded multilayer capacitor.

However, since a three-terminal embedded multilayer capacitor according to the related art has a thick edge portion of a ground electrode, a problem in which a degree of smoothness is not secured may occur.

SUMMARY

An aspect of the present disclosure provides a multilayer capacitor securing a degree of smoothness of a ground electrode, higher than a certain degree, while preventing reliability degradation.

According to an aspect of the present disclosure, a multilayer capacitor includes a capacitor body having a first surface and a second surface opposing each other, a third surface and a fourth surface connected to the first surface and the second surface and opposing each other, and a fifth surface and a sixth surface connected to the first surface and the second surface, connected to the third surface and the fourth surface, and opposing each other. The capacitor body further includes a plurality of dielectric layers, and pluralities of first internal electrodes, second internal electrodes, and third internal electrodes alternately disposed with the dielectric layers interposed therebetween. A connecting electrode is disposed on the second surface of the capacitor body, and a first external electrode and a second external electrode are disposed on the third surface and the fourth surface of the capacitor body, respectively. A third external electrode and a fourth external electrode are disposed on the fifth surface and the sixth surface of the capacitor body, respectively, and extend to cover opposing ends of the connecting electrode, respectively. The first internal electrodes are exposed through the fifth surface of the capacitor body, and are connected to the third external electrode, the second internal electrodes are exposed through the sixth surface of the capacitor body, and are connected to the fourth external electrode, and the third internal electrodes are exposed through the third surface and the fourth surface of the capacitor body, and are connected to the first external electrode and the second external electrode.

The capacitor body may have a thickness, between the first and second surfaces, smaller than a width, between the fifth and sixth surfaces.

The connecting electrode may include nickel, and the third external electrode and the fourth external electrode may include copper or silver.

The connecting electrode may include a main element the same as the first internal electrodes, the second internal electrodes, and the third internal electrodes, and the third external electrode and the fourth external electrode may include copper or silver.

Each first internal electrode may include a first body part overlapping the third internal electrodes, and a first lead portion extended from the first body part to be exposed through the fifth surface of the capacitor body, and each second internal electrode may include a second body part overlapping the third internal electrodes and the first body parts, and a second lead portion extended from the second body part to be exposed through the sixth surface of the capacitor body.

The first external electrode and the second external electrode may include a first connecting portion and a second connecting portion, and a first band part and a second band part, respectively. The first connecting portion and the second connecting portion may be disposed on the third surface and the fourth surface of the capacitor body, respectively, and the first band part and the second band part may extend from the first connecting portion and the second connecting portion, respectively, to portions of the first surface, the second surface, the fifth surface, and the sixth surface of the capacitor body.

The first external electrode, the second external electrode, the third external electrode, the fourth external electrode, and the connecting electrode may each include a nickel-tin plating layer.

The first external electrode, the second external electrode, the third external electrode, the fourth external electrode, and the connecting electrode may each include a copper plating layer.

The capacitor body may have a thickness of 0.25 mm or less.

According to another aspect of the present disclosure, a multilayer capacitor may include a capacitor body having pluralities of first and second internal electrodes alternately stacked in the capacitor body, and a plurality of dielectric layers disposed between each adjacent pair of first and second internal electrodes in the capacitor body. A connecting electrode is disposed on a first surface of the capacitor body, and first and second external electrodes each include a connecting portion disposed on a respective one of second and third opposing surfaces of the capacitor body adjacent to the first surface. Each of the first and second external electrodes includes a band part extending from the respective connecting portion onto a surface of the connecting electrode disposed on the first surface of the capacitor body.

The connecting electrode may extend across a width of the first surface of the capacitor body between the second and third surfaces, and the band parts of the first and second external electrodes may extend onto opposing ends of the connecting electrode.

Each first internal electrode may extend in a plane parallel to the first surface of the capacitor body, extend to the second surface of the capacitor body to contact the first external electrode, and be spaced apart from the third surface of the capacitor body, and each second internal electrode may extend in a plane parallel to the first surface of the capacitor body, extend to the third surface of the capacitor body to contact the second external electrode, and be spaced apart from the second surface of the capacitor body.

The capacitor body may further include a plurality of third internal electrodes disposed between each adjacent pair of first and second internal electrodes stacked in the capacitor body. The dielectric layers of the plurality of dielectric layers may be disposed between each adjacent pair of first, second, or third internal electrodes in the capacitor body.

Each third internal electrode may extend in a plane parallel to the first surface of the capacitor body, and be spaced apart from the second and third surfaces of the capacitor body.

The multilayer capacitor may further include third and fourth external electrodes disposed on a respective one of fourth and fifth opposing surfaces of the capacitor body adjacent to the first, second, and third surfaces of the capacitor body. Each third internal electrode may extend to the fourth and fifth surfaces of the capacitor body to contact the third and fourth external electrodes.

The capacitor body may have a thickness, measured in a stacking direction of the first and second internal electrodes and dielectric layers, smaller than a width, measured between the second and third surfaces.

According to another aspect of the present disclosure, a multilayer capacitor includes a capacitor body having pluralities of first, second, and third internal electrodes alternately stacked with dielectric layers therebetween, wherein the capacitor body has a thickness smaller than a width thereof, and a length larger than the width. A connecting electrode is disposed on a first surface of the capacitor body disposed opposite to a second surface thereof in the thickness direction of the capacitor body. First and second external electrodes are respectively disposed on third and fourth surfaces of the capacitor body opposite each other in the width direction of the capacitor body, respectively contact the pluralities of first and second internal electrodes, and each contact the connecting electrode.

The first and second external electrodes may each extend onto a respective end of two opposing ends of the connecting electrode.

The multilayer capacitor may further include third and fourth external electrodes respectively disposed on fifth and sixth surfaces of the capacitor body opposite each other in the length direction of the capacitor body, and may each contact the pluralities of third internal electrodes.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
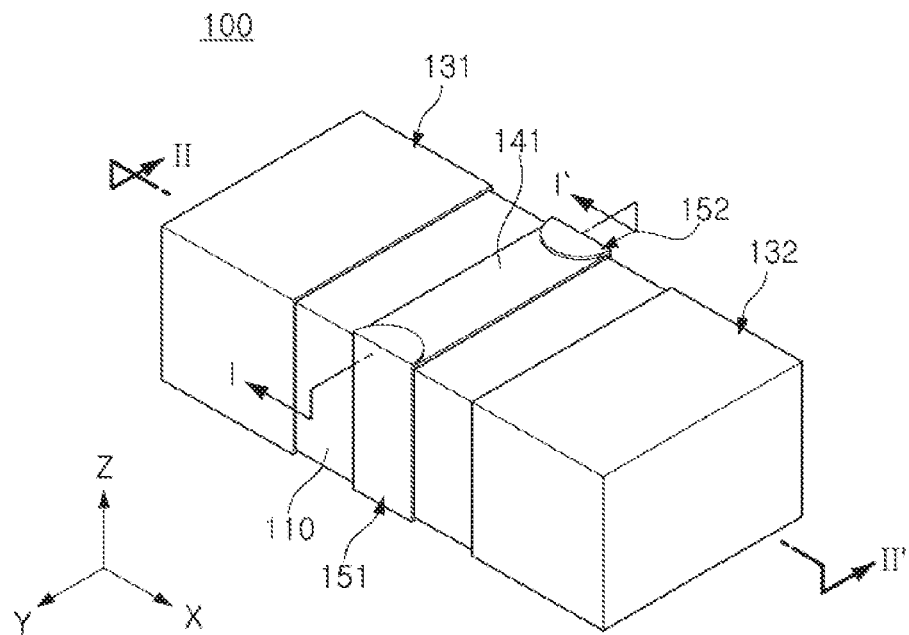
FIG. 1 is a perspective view illustrating a multilayer capacitor according to an exemplary embodiment.

Hereinafter, embodiments of the present disclosure will be described with reference to the attached drawings.

The present disclosure may, however, be exemplified in many different forms and should not be construed as being limited to the specific embodiments set forth herein. Rather, these embodiments are illustrative and are provided so that this disclosure will be thorough, complete, and will fully convey the scope of the disclosure to those skilled in the art.

Throughout the specification, it will be understood that when an element, such as a layer, region, or wafer (substrate), is referred to as being 'on,' 'connected to,' or 'coupled to' another element, it can be directly 'on,' 'connected to,' or 'coupled to' the other element or other elements intervening therebetween may be present. In contrast, when an element is referred to as being 'directly on,' 'directly connected to,' or 'directly coupled to' another element, there may be no other elements or layers intervening therebetween. Like numerals refer to like elements throughout. As used herein, the term 'and/or' includes any and all combinations of one or more of the associated listed items.

It will be apparent that although the terms first, second, third, etc. may be used herein to describe various members, components, regions, layers, and/or sections, any such members, components, regions, layers, and/or sections should not be limited by these terms. These terms are only used to distinguish one member, component, region, layer, or section from another member, component, region, layer, or section. Thus, a first member, component, region, layer, or section discussed below could be termed a second member, component, region, layer, or section without departing from the teachings of the exemplary embodiments.

Spatially relative terms, such as 'above,' 'upper,' 'below,' 'lower,' and the like, may be used herein for ease of description to describe one element's positional relationship relative to other element(s) in the illustrative orientation shown in the figures. It will be understood that spatially relative terms are intended to encompass different orientations of the device in use or operation, in addition to the orientation depicted in the figures. For example, if the device in the figures is turned over, elements described as 'above' or 'upper' relative to other elements would then be oriented 'below' or 'lower' relative to the other elements or features. Thus, the term 'above' can encompass both the above and below orientations depending on a particular direction of the device and/or figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms 'a,' 'an,' and 'the' are intended to include the plural forms as well, unless the context clearly indicates otherwise. It will be further understood that the terms 'comprises' and/or 'comprising,' when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating the embodiments of the present disclosure. In the drawings, for example, due to variations in manufacturing techniques and/or tolerances, modifications of the shape shown may be estimated. Thus, embodiments of the present disclosure should not be construed as being limited to the particular shapes of regions shown herein but should more generally be understood to include, for example, changes in shape resulting from manufacturing techniques and tolerances. The following embodiments may also be constituted alone, in combination, or in partial combination.

The contents of the present disclosure described below may have a variety of configurations and propose only a required configuration herein, but are not limited thereto.

A multilayer capacitor according to an exemplary embodiment has a structure in which a connecting electrode is formed on a surface opposite to a surface on which a capacitor body is mounted, and a third external electrode and a fourth external electrode are extended to cover both ends of the connecting electrode in both surfaces in a width direction of the capacitor body.

Here, a multilayer capacitor 100 according to an exemplary embodiment may be applied to a multilayer capacitor embedded in a substrate as a three-terminal multilayer capacitor.

Hereinafter, when directions of the capacitor body 110 are defined to clearly explain an exemplary embodiment of the present disclosure, X, Y, and Z, illustrated in the drawings, represent a longitudinal direction, a width direction, and a thickness direction of the capacitor body 110, respectively.

Figure 2:
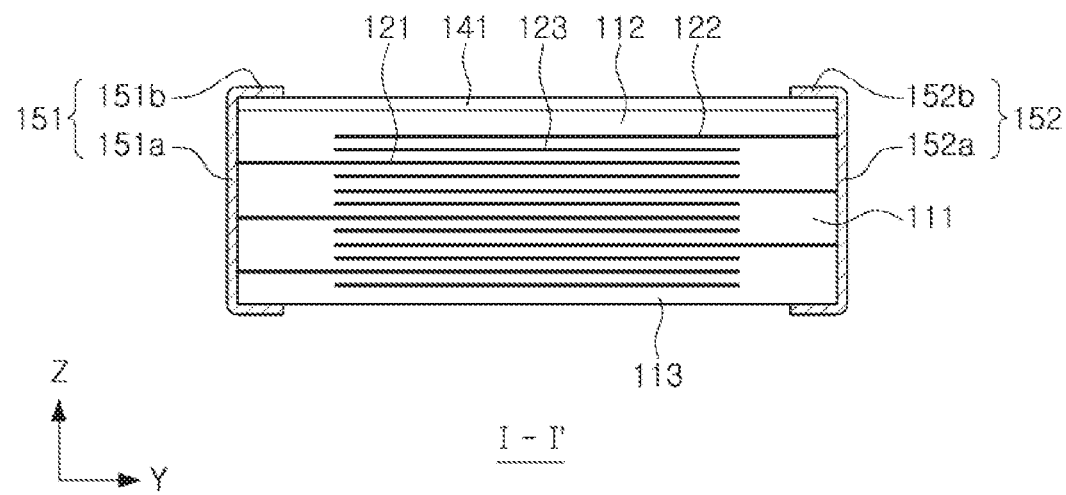
FIG. 2 is a cross-sectional view taken along line I-I' of FIG. 1.
Figure 3:
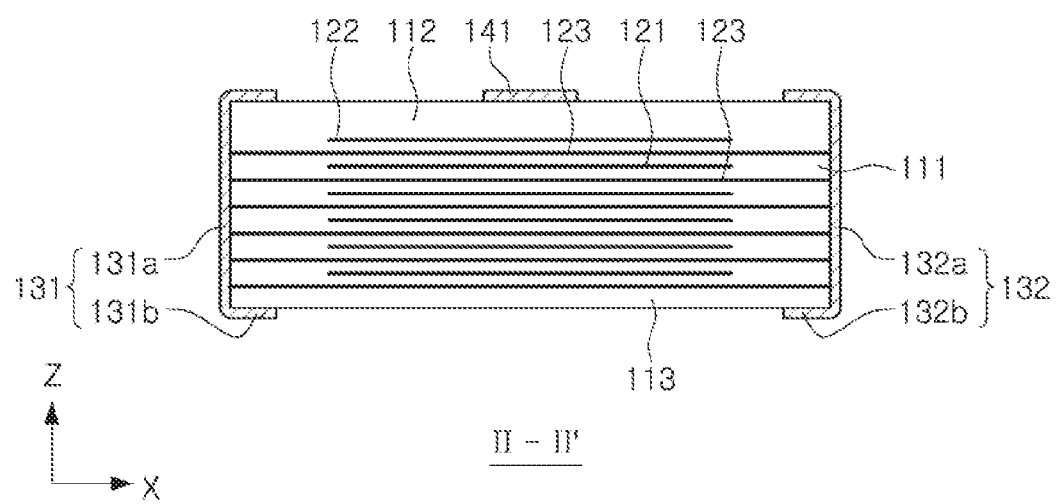
FIG. 3 is a cross-sectional view taken along line II-II' of FIG. 1.
Figure 4A:
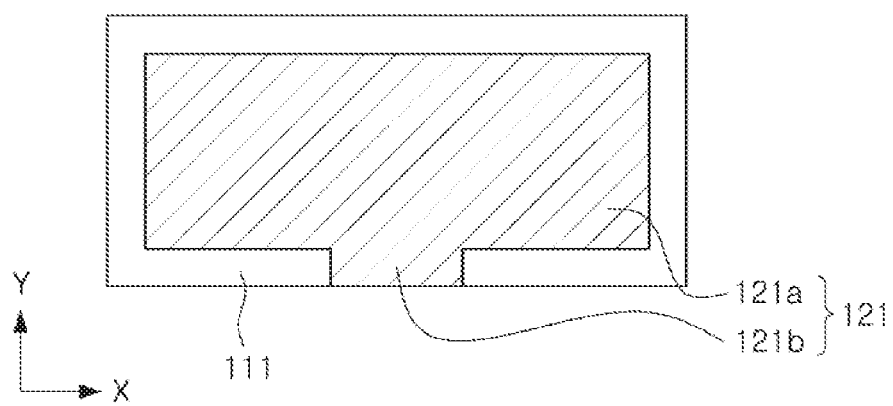
FIGS. 4A, 4B, and 4C are plan views illustrating structures of a first internal electrode, a second internal electrode, and a third internal electrode of a capacitor body of FIG. 1, respectively.
Figure 4B:
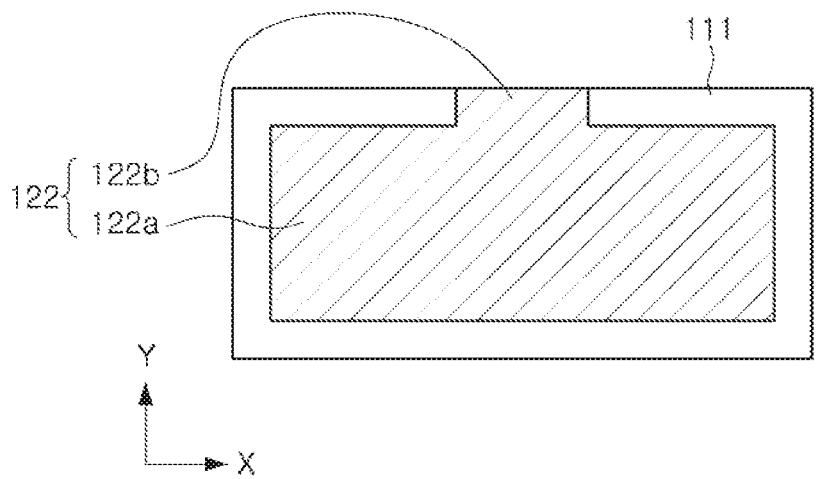
Figure 4C:
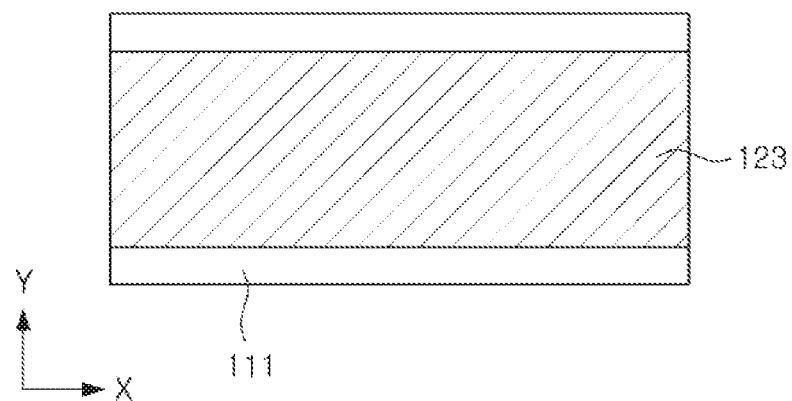

FIG. 1 is a perspective view illustrating a multilayer capacitor according to an exemplary embodiment, FIG. 2 is a cross-sectional view taken along line I-I' of FIG. 1, FIG. 3 is a cross-sectional view taken along line II-II' of FIG. 1, and FIGS. 4A to 4C are plan views illustrating structures of a first internal electrode, a second internal electrode, and a third internal electrode of a capacitor body of FIG. 1, respectively.

Referring to FIGS. 1 to 3 and 4A to 4C, the multilayer capacitor 100 according to an exemplary embodiment may include a capacitor body 110, a connecting electrode 141, a first external electrode 131 and a second external electrode 132, as well as a third external electrode 151 and a fourth external electrode 152.

The capacitor body 110 may include an active region including dielectric layers 111 and a plurality of internal electrodes alternately disposed in a Z direction with the dielectric layers 111 interposed therebetween, and cover regions 112 and 113 disposed above and below the active region in the Z direction.

In addition, the capacitor body 110 has a first surface and a second surface opposing each other in the Z direction, a third surface and a fourth surface connected to the first surface and the second surface and opposing each other in an X direction, as well as a fifth surface and a sixth surface connected to the first surface and the second surface, connected to the third surface and the fourth surface, and opposing each other in a Y direction.

In this case, as the plurality of dielectric layers 111 are stacked in the Z direction, the capacitor body 110 may be provided. A shape and dimensions of the capacitor body 110 as well as a stacking number of the dielectric layers 111 are not limited to those illustrated in an exemplary embodiment.

In addition, the plurality of dielectric layers 111, providing the capacitor body 110, may be in a sintered state, and adjacent dielectric layers 111 may be integrated with each other so that boundaries therebetween are not readily apparent without using a scanning electron microscope (SEM).

In addition, a raw material of the dielectric layer 111 is not particularly limited as long as sufficient capacitance may be obtained. For example, the raw material of the dielectric layer 111 may include barium titanate ($BaTiO_3$) powder particles.

For example, a material of the dielectric layer 111 may be prepared by adding various ceramic additives, organic solvents, plasticizers, binders, dispersing agents, and the like, to powder particles such as the barium titanate ($BaTiO_3$) powder particles, or the like, according to an object of the present disclosure.

In an exemplary embodiment, the cover regions 112 and 113 of the capacitor body 110 may have a material and a configuration the same as those of the dielectric layer 111 except that the cover regions do not include any internal electrode.

As a single dielectric layer or two or more dielectric layers are stacked on both outermost edges of the body 110 in the Z direction, the cover regions 112 and 113 may be provided. Thus, the cover regions basically serve to prevent damage to the first internal electrode 121, the second internal electrode 122, and the third internal electrode 123 caused by physical or chemical stress.

In addition, in an exemplary embodiment, the capacitor body 110 may have a thickness, in the Z direction, smaller than a width in the Y direction.

The internal electrodes may include a first internal electrode 121, a second internal electrode 122, and a third internal electrode 123.

The first internal electrode 121 and the second internal electrode 122 are a pair of electrodes having different polarities, while the first internal electrode 121, the second internal electrode 122, and the third internal electrode 123 may be electrically insulated from each other by the dielectric layers 111 interposed therebetween.

The first internal electrode 121 may be exposed through the fifth surface of the capacitor body 110 in the Y direction.

In this case, the first internal electrode 121 may include a first body part 121a and a first lead portion 121b extended from the first body part 121a to be exposed through the fifth surface of the capacitor body 110 in the Y direction.

The second internal electrode 122 may be exposed through the sixth surface of the capacitor body 110 in the Y direction.

In this case, the second internal electrode 122 may include a second body part 122a overlapping the first body part 121a in the Z direction and a second lead portion 122b extended from the second body part 122a to be exposed through the sixth surface of the capacitor body 110 in the Y direction.

The first lead portion 121b and the second lead portion 122b may be provided in positions opposing each other in the Y direction.

The third internal electrode 123 may be provided with both ends exposed through the third surface and the fourth surface of the capacitor body 110 opposite each other in the X direction, respectively.

In this case, the third internal electrode 123 may overlap the first body part 121a of the first internal electrode 121 and the second body part 122a of the second internal electrode 122 in the Z direction.

In addition, as a conductive paste is printed on each dielectric layer 111, one of the first internal electrode 121, the second internal electrode 122, and the third internal electrode 123 may be provided. A conductive metal, contained in the conductive paste, may be one among silver (Ag), palladium (Pd), platinum (Pt), nickel (Ni), and copper (Cu), or alloys thereof, but an exemplary embodiment is not limited thereto.

In addition, a printing method of the conductive paste may be a screen or gravure printing method, or the like, but an exemplary embodiment is not limited thereto.

The connecting electrode 141 may be disposed on the second surface of the capacitor body 110 in the Z direction.

In this case, the connecting electrode 141 may be provided using a printing method. For example, as the second surface of the capacitor body 110 is coated with Ni using the printing method, and is then co-sintered, the connecting electrode 141 may be provided.

As another example, as the second surface of the capacitor body 110 is coated with a main element, the same as an internal electrode, using the printing method, and is then co-sintered, the connecting electrode 141 may be provided.

The connecting electrode 141 may be used as a ground terminal.

The first external electrode 131 and the second external electrode 132 may be respectively disposed on the third surface and the fourth surface of the capacitor body 110 opposite each other in the X direction.

In addition, the first external electrode 131 and the second external electrode 132 are connected to both ends, respectively exposed through the third surface and the fourth surface of the capacitor body 110, of the third internal electrode 123, to be electrically connected thereto.

In this case, the first external electrode 131 and the second external electrode 132 may be provided using the printing method, and may be provided by coating the third surface and the fourth surface of the capacitor body 110 with Ni using the printing method and co-sintering.

The first external electrode 131 may include a first connecting portion 131a provided on the third surface of the capacitor body 110 and connected to one end of the third internal electrode 123 to be electrically connected thereto, and a first band part 131b extended from the first connecting portion 131a to portions of the first surface, the second surface, the fifth surface, and the sixth surface of the capacitor body 110.

In addition, the second external electrode 132 may include a second connecting portion 132a provided on the fourth surface of the capacitor body 110 and connected to the other end of the third internal electrode 123 to be electrically connected thereto, and a second band part 132b extended from the second connecting portion 132a to portions of the first surface, the second surface, the fifth surface, and the sixth surface of the capacitor body 110.

The third external electrode 151 and the fourth external electrode 152 are disposed on the fifth surface and the sixth surface of the capacitor body 110 opposite each other in the Y direction to be spaced apart from both the first external electrode 131 and the second external electrode 132.

In this case, the third external electrode 151 and the fourth external electrode 152 may be extended to cover upper portions of respective ends of the connecting electrode 141 in the second surface of the capacitor body 110.

In other words, the third external electrode 151 may include a third connecting portion 151a provided on the fifth surface of the capacitor body 110 and connected to the first lead portion 121b of the first internal electrode 121 to be electrically connected thereto, and a third band part 151b extended from the third connecting portion 151a to a portion of the second surface of the capacitor body 110 to cover an upper portion of one end of the connecting electrode 141.

In addition, the fourth external electrode 152 may include a fourth connecting portion 152a provided on the sixth surface of the capacitor body 110 and connected to the second lead portion 122b of the second internal electrode 122 to be electrically connected thereto, and a fourth band part 152b extended from fourth connecting portion 152a to a portion of the second surface of the capacitor body 110 to cover an upper portion of the other end of the connecting electrode 141.

The third external electrode 151 and the fourth external electrode 152 may be provided after the connecting electrode 141 is formed on the second surface of the capacitor body 110.

In this case, the third external electrode 151 and the fourth external electrode 152 may be provided using a transfer method or a wheel method. For example, as copper or silver is transferred to the fifth surface and the sixth surface of the capacitor body 110 or is applied using a wheel method, the third external electrode 151 and the fourth external electrode 152 may be provided.

Meanwhile, a plating layer may be further provided on the first external electrode 131, the second external electrode 132, the third external electrode 151, and the fourth external electrode 152 according to an exemplary embodiment.

In this case, a plating layer, formed on the connecting electrode 141, the third external electrode 151, and the fourth external electrode 152, may have a strip form, and thus may be provided in the form of covering the connecting electrode 141, the third external electrode 151, and the fourth external electrode 152 simultaneously.

In an exemplary embodiment, the connecting electrode 141 is formed by coating using a printing method and co-sintering, and the third external electrode 151 and the fourth external electrode 152 are provided thereabove using a transfer method or a wheel method to cover both ends of the connecting electrode 141, thereby improving a degree of smoothness. Thus, there may be an advantage in which it may be easily used as a chip for embedding after a plating layer is provided.

Figure 5:
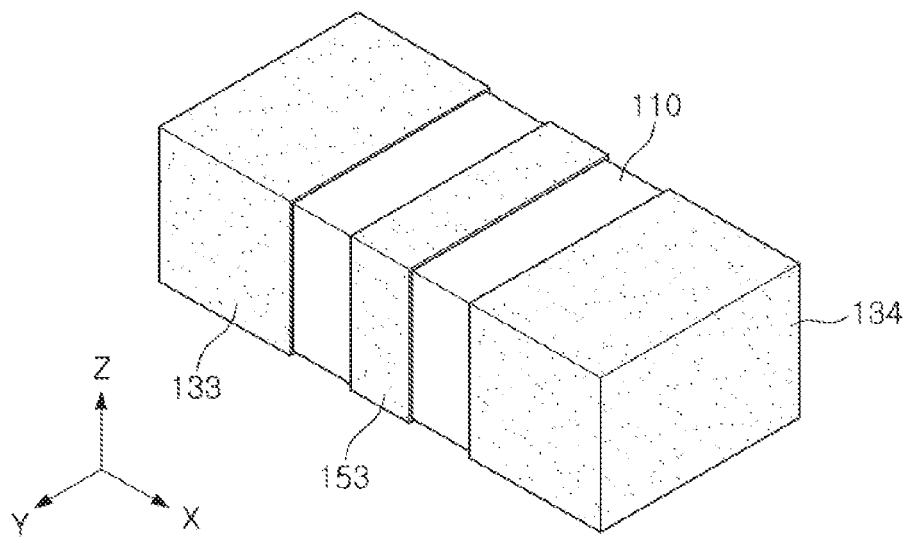
FIG. 5 is a perspective view illustrating a state in which an external electrode and a connecting electrode of FIG. 1 are nickel-tin (Ni—Sn) plated.

In this case, the plating layer may be nickel-tin (Ni—Sn) plating layers 133, 134, and 153 as illustrated in FIG. 5, but an exemplary embodiment is not limited thereto.

Figure 6:
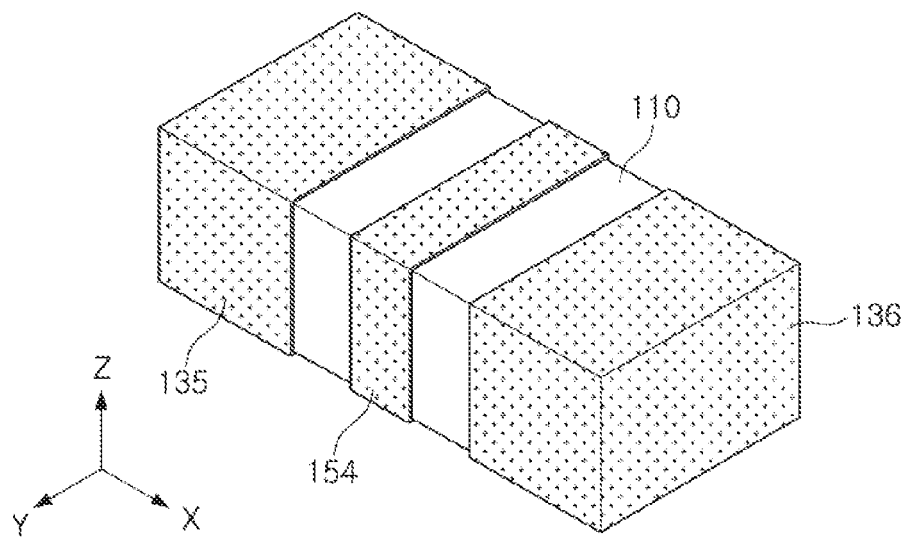
FIG. 6 is a perspective view illustrating a state in which an external electrode and a connecting electrode of FIG. 1 are copper (Cu) plated.

For example, the plating layer may be copper (Cu) plating layers 135, 136, and 154 as illustrated in FIG. 6, or may be variously applied. In this case, when the plating layer is formed of copper as illustrated in FIG. 6, the plating layer may be applied to an embedded chip requiring a copper plating layer.

A multilayer capacitor serves to supply current to an application processor (AP). In this case, in order to supply high-frequency current quickly, a multilayer capacitor with low equivalent series inductance (ESL) may be used or a multilayer capacitor may be embedded in a substrate, thereby significantly reducing a distance with the AP.

In the case of the former, in which the multilayer capacitor with low ESL is manufactured, another problem may occur in terms of a structure. Recently, the research on the latter, in which the multilayer capacitor is embedded in a substrate, has been actively conducted.

In the case of the embedded multilayer capacitor, to connect an external electrode to an external wiring through a via, it is generally necessary to form a band part on the external electrode within a certain area or more. In the case of a three-terminal multilayer capacitor according to the related art, after a third external electrode and a fourth external electrode are provided, a connecting electrode is provided to cover an end of each of the third external electrode and the fourth external electrode. Here, there may be the problems in which an edge portion of the external electrode may become convex, a thickness of the connecting electrode may not be uniform and may be increased, and a degree of smoothness may be lowered.

After the embedded multilayer capacitor is embedded in a substrate, a via hole is formed to pass through a resin and to expose an external electrode of a multilayer capacitor using a laser, and the via hole is filled by copper plating to allow an external wiring and the external electrode of the multilayer capacitor to be electrically connected to each other.

In this case, while the laser passes through a plating layer of the multilayer capacitor, due to a glass element of the external electrode, the laser may be absorbed. Thus, a capacitor body may be directly damaged thereby. It may be required that a thickness of the plating layer is increased, a thickness of the external electrode is uniform, and a surface is smooth.

If a thickness of the external electrode is not uniform and a surface is not smooth, laser light may be diffused on a surface of a plating layer. Thus, a peripheral resin portion may be damaged, so a machined surface may not be smoothly provided. In this case, during plating, an interior of a via hole may be non-uniformly plated, so cracking may occur on a cross section of a via.

In this regard, when the multilayer capacitor is embedded in a three-terminal embedded substrate, the multilayer capacitor may be connected to a substrate by via hole processing. Thus, smoothness of a connecting electrode may be important.

According to an exemplary embodiment, in a manner similar to the method of using three-terminals according to the related art, a connecting electrode is provided using a printing method as aground terminal, and plating is performed thereabove to provide a plating layer, so a multilayer capacitor to be embedded may be prepared.

In this case, the connecting electrode 141 is only disposed on the second surface of the capacitor body 110, and the third external electrode 151 and the fourth external electrode 152, formed using a transfer method or a wheel method, has a structure covering both ends of the connecting electrode 141. As compared to a conventional structure in which a third external electrode and a fourth external electrode overlap above a connecting electrode on a surface opposing a surface on which a capacitor body is mounted and an edge connected to the surface opposing a surface on which a capacitor body is mounted, an edge portion may be thinner. Thus, a thickness of a connecting electrode may be provided to be thinner, and a degree of smoothness may be improved.

In detail, the connecting electrode 141, formed on the second surface of the capacitor body 110, is provided using a printing method. Thus, when being mounted in a substrate as a three-terminal embedded capacitor, a degree of smoothness, higher than a certain degree, may be secured without reliability degradation Thus, it may be applied to a multilayer capacitor having a thin thickness, for example, a maximum thickness based on a completed chip of 0.25 mm.

As set forth above, according to an exemplary embodiment, while reliability of a multilayer capacitor may be prevented from degrading, a degree of smoothness of a connecting electrode serving as a ground terminal, higher than a certain degree, may be secured.

While exemplary embodiments have been shown and described above, it will be apparent to those skilled in the art that modifications and variations could be made without departing from the scope of the present invention as defined by the appended claims.

What is claimed is:

1. A multilayer capacitor, comprising:
a capacitor body having a first surface and a second surface opposing each other in a first direction, a third surface and a fourth surface connected to the first surface and the second surface and opposing each other, and a fifth surface and a sixth surface connected to the first surface and the second surface, connected to the third surface and the fourth surface, and opposing each other, and including a plurality of dielectric layers, and pluralities of first internal electrodes, second internal electrodes, and third internal electrodes alternately disposed with the dielectric layers interposed therebetween;
a connecting electrode disposed on the second surface of the capacitor body;
a first external electrode and a second external electrode disposed on the third surface and the fourth surface of the capacitor body, respectively; and
a third external electrode and a fourth external electrode disposed on the fifth surface and the sixth surface of the capacitor body, respectively,
wherein the first internal electrodes are exposed through the fifth surface of the capacitor body, and are connected to the third external electrode,
the second internal electrodes are exposed through the sixth surface of the capacitor body, and are connected to the fourth external electrode,
the third internal electrodes are exposed through the third surface and the fourth surface of the capacitor body, and are connected to the first external electrode and the second external electrode,
the third external electrode contacts portions of the first internal electrodes exposed through the fifth surface and extends onto the second surface of the capacitor body to cover, and overlap in the first direction, a first end of the connecting electrode, and
the fourth external electrode contacts portions of the second internal electrodes exposed through the sixth surface and extends onto the second surface of the capacitor body to cover, and overlap in the first direction, a second end of the connecting electrode opposite to the first end.

2. The multilayer capacitor of claim 1, wherein the capacitor body has a thickness, between the first and second surfaces, smaller than a width, between the fifth and sixth surfaces.

3. The multilayer capacitor of claim 1, wherein the connecting electrode includes nickel, and
the third external electrode and the fourth external electrode include copper or silver.

4. The multilayer capacitor of claim 1, wherein a main element of the connecting electrode is same as a main element of the first internal electrodes, the second internal electrodes, and the third internal electrodes, and
the third external electrode and the fourth external electrode include copper or silver.

5. The multilayer capacitor of claim 1, wherein each first internal electrode includes a first body part overlapping the third internal electrodes, and a first lead portion extended from the first body part to be exposed through the fifth surface of the capacitor body, and
each second internal electrode includes a second body part overlapping the third internal electrodes and the first body parts, and a second lead portion extended from the second body part to be exposed through the sixth surface of the capacitor body.

6. The multilayer capacitor of claim 1, wherein the first external electrode and the second external electrode include a first connecting portion and a second connecting portion, and a first band part and a second band part, respectively,
the first connecting portion and the second connecting portion are disposed on the third surface and the fourth surface of the capacitor body, respectively,
the first band part and the second band part extend from the first connecting portion and the second connecting portion, respectively, to portions of the first surface, the second surface, the fifth surface, and the sixth surface of the capacitor body.

7. The multilayer capacitor of claim 1, wherein the first external electrode, the second external electrode, the third external electrode, the fourth external electrode, and the connecting electrode each include a nickel-tin plating layer.

8. The multilayer capacitor of claim 1, wherein the first external electrode, the second external electrode, the third external electrode, the fourth external electrode, and the connecting electrode each include a copper plating layer.

9. The multilayer capacitor of claim 1, wherein the capacitor body has a thickness of 0.25 mm or less.

10. The multilayer capacitor of claim 1, wherein the third external electrode includes a third connecting portion and a third band part, the third connecting portion is disposed on the fifth surface of the capacitor body, and the third band part is extended from the third connecting portion to a portion of the second surface of the capacitor body and covers in the first direction an upper portion of an end portion of the connecting electrode, and
the fourth external electrode includes a fourth connecting portion and a fourth band part, the fourth connecting portion is disposed on the sixth surface of the capacitor body, and the fourth band part is extended from the fourth connecting portion to a portion of the second surface of the capacitor body and covers in the first direction an upper portion of another end portion of the connecting electrode.

11. A multilayer capacitor comprising:
a capacitor body including:
pluralities of first and second internal electrodes alternately stacked in the capacitor body and respectively exposed through second and third opposing surfaces of the capacitor body, and
a plurality of dielectric layers disposed between each adjacent pair of first and second internal electrodes in the capacitor body;
a connecting electrode disposed on a first surface of the capacitor body; and
first and second external electrodes each including a connecting portion disposed on a respective one of the second and third opposing surfaces of the capacitor body adjacent to the first surface to respectively contact the first and second internal electrodes,
wherein each of the first and second external electrodes further includes a band part extending from the respective connecting portion, which contacts a respective one of the first internal electrodes and the second internal electrodes, to cover and overlap, in a stacking direction of the first and second internal electrodes, a respective end of a first surface of the connecting electrode disposed opposite to a second surface of the connecting electrode facing the first surface of the capacitor body.

12. The multilayer capacitor of claim 11, wherein the connecting electrode extends across a full width of the first surface of the capacitor body between the second and third surfaces, and
the band parts of the first and second external electrodes extend onto opposing ends of the connecting electrode such that each opposing end of the connecting electrode is disposed between the band part of a corresponding one of the first and second external electrodes and the capacitor body in a thickness direction orthogonal to the first surface of the capacitor body.

13. The multilayer capacitor of claim 12, wherein each band part extends onto the connecting electrode by a distance less than the width of the capacitor body.

14. The multilayer capacitor of claim 11, wherein each first internal electrode extends in a plane parallel to the first surface of the capacitor body, extends to the second surface of the capacitor body to contact the first external electrode, and is spaced apart from the third surface of the capacitor body, and
each second internal electrode extends in a plane parallel to the first surface of the capacitor body, extends to the third surface of the capacitor body to contact the second external electrode, and is spaced apart from the second surface of the capacitor body.

15. The multilayer capacitor of claim 14, wherein the capacitor body further comprises:
a plurality of third internal electrodes disposed between each adjacent pair of first and second internal electrodes stacked in the capacitor body,
wherein the dielectric layers of the plurality of dielectric layers are disposed between each adjacent pair of first, second, or third internal electrodes in the capacitor body.

16. The multilayer capacitor of claim 15, wherein each third internal electrode extends in a plane parallel to the first surface of the capacitor body, and is spaced apart from the second and third surfaces of the capacitor body.

17. The multilayer capacitor of claim 16, further comprising:
third and fourth external electrodes disposed on a respective one of fourth and fifth opposing surfaces of the capacitor body adjacent to the first, second, and third surfaces of the capacitor body,
wherein each third internal electrode extends to the fourth and fifth surfaces of the capacitor body to contact the third and fourth external electrodes.

18. The multilayer capacitor of claim 11, wherein the capacitor body has a thickness, measured in a stacking direction of the first and second internal electrodes and dielectric layers, smaller than a width, measured between the second and third surfaces.

19. A multilayer capacitor comprising:
a capacitor body including pluralities of first, second, and third internal electrodes alternately stacked with dielectric layers therebetween,
wherein the capacitor body has a thickness smaller than a width thereof, and a length larger than the width;
a connecting electrode disposed on a first surface of the capacitor body disposed opposite to a second surface thereof in the thickness direction of the capacitor body; and
first and second external electrodes respectively disposed on third and fourth surfaces of the capacitor body opposite each other in the width direction of the capacitor body, wherein the first and second external electrodes contact portions of the pluralities of first and second internal electrodes exposed to the third and fourth surfaces, respectively, and extend onto opposing ends of the connecting electrode on the first surface of the capacitor body to overlap the opposing ends of the connecting electrode in the thickness direction.

20. The multilayer capacitor of claim 19, wherein the connecting electrode extends in the width direction over the entire width of the capacitor body, and the first and second external electrodes each extend onto a respective end of two opposing ends of the connecting electrode.

21. The multilayer capacitor of claim 19, further comprising:

third and fourth external electrodes respectively disposed on fifth and sixth surfaces of the capacitor body opposite each other in the length direction of the capacitor body, and each contacting the pluralities of third internal electrodes.

\* \* \* \* \*